(12) United States Patent
Park

(10) Patent No.: US 11,590,986 B2
(45) Date of Patent: Feb. 28, 2023

(54) VEHICLE EQUIPPED WITH ELECTRIC MOTOR AND METHOD OF OUTPUTTING WARNING FOR THE SAME

(71) Applicants: HYUNDAI MOTOR COMPANY, Seoul (KR); KIA CORPORATION, Seoul (KR)

(72) Inventor: Joon Young Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 125 days.

(21) Appl. No.: 17/377,686

(22) Filed: Jul. 16, 2021

(65) Prior Publication Data

US 2022/0080995 A1 Mar. 17, 2022

(30) Foreign Application Priority Data

Sep. 15, 2020 (KR) .................... 10-2020-0118097

(51) Int. Cl.
*B60W 50/14* (2020.01)
*B60W 30/14* (2006.01)
*B60W 40/06* (2012.01)
*B60W 40/105* (2012.01)
*B60W 50/00* (2006.01)

(52) U.S. Cl.
CPC .......... *B60W 50/14* (2013.01); *B60W 30/143* (2013.01); *B60W 40/06* (2013.01); *B60W 40/105* (2013.01); *B60W 2050/0083* (2013.01); *B60W 2050/143* (2013.01); *B60W 2050/146* (2013.01); *B60W 2510/083* (2013.01); *B60W 2552/35* (2020.02)

(58) Field of Classification Search
CPC .... B60W 50/14; B60W 30/143; B60W 40/06; B60W 40/105; B60W 2050/0083; B60W 2050/143; B60W 2050/146; B60W 2510/083; B60W 2552/35
See application file for complete search history.

(56) References Cited

U.S. PATENT DOCUMENTS

| | | | |
|---|---|---|---|
| 9,889,744 B2* | 2/2018 | Nakano | B60L 3/102 |
| 11,046,332 B2* | 6/2021 | Akaba | B60W 10/04 |
| 2013/0131925 A1* | 5/2013 | Isaji | B60K 31/0066 |
| | | | 701/41 |
| 2018/0208245 A1* | 7/2018 | Mizutani | B60W 30/06 |
| 2019/0126918 A1* | 5/2019 | Takayanagi | B60W 30/09 |
| 2019/0155303 A1* | 5/2019 | Kawabe | B60W 50/0097 |
| 2020/0086890 A1* | 3/2020 | Ikeda | B60W 30/18163 |

* cited by examiner

*Primary Examiner* — Mohamed Barakat
(74) *Attorney, Agent, or Firm* — Morgan, Lewis & Bockius LLP

(57) ABSTRACT

A vehicle provided with an electric motor configured for outputting warning through torque control of the motor and a method of outputting warning for the same, may include: recognizing, by a controller, a stop point or a deceleration section where a pause or deceleration of the vehicle is required or recommended; setting, by the controller, a virtual road surface facility based on the stop point or a start point of the deceleration section; outputting, by the controller, information on a set position of the set virtual facility or a distance remaining from the vehicle to the set position; and implementing, by the controller, driving feeling passing through the set virtual road surface facility as a pitching motion of the vehicle using a torque control of the electric motor according to a vehicle speed when the electric vehicle passes the set position.

19 Claims, 8 Drawing Sheets

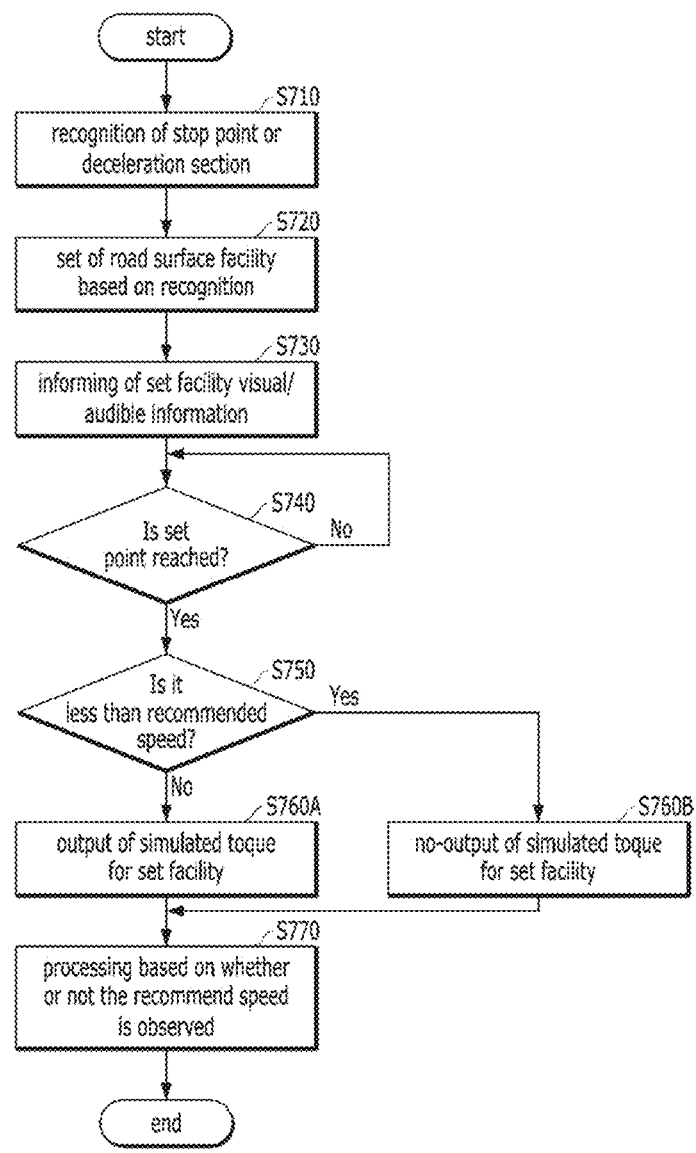

VEHICLE EQUIPPED WITH ELECTRIC MOTOR AND METHOD OF OUTPUTTING WARNING FOR THE SAME

The present application claims priority to Korean Patent Application No. 10-2020-0118097, filed on Sep. 15, 2020, the entire contents of which is incorporated herein for all purposes by this reference.

BACKGROUND OF THE INVENTION

Field of the Invention

The present invention relates to a vehicle provided with an electric motor capable of outputting a warning through torque control of the motor and a method of outputting warning for the same.

Description of Related Art

Since vehicle overspeed prevention is directly related to the protection of pedestrians and the reduction of an accident rate, various efforts have been made in the social and vehicle aspects to prevent overspeed. For example, on the social aspect, punishment was strengthened through laws and regulations, and enforcement equipment and overspeed prevention facilities (speed bumps, bumps on a road surface, etc.) were provided. On the vehicle aspect, speed limit information and a warning sound when speeding are provided, or a function of forcibly limiting a vehicle speed when entering a specific area is also provided.

However, in the case of the speed bump, although there is an effect of inducing a deceleration before passing, there are problems of frequent re-acceleration after passing, requiring for continuous maintenance, and deterioration of the comfort of a vehicle occupant running at a sufficiently low speed.

Furthermore, the speed limit information provided by a vehicle and a speeding warning sound are often insufficient for the driver's attention depending on a situation, and if there is no danger in the driver's field of view, it often happens that the driver ignores the speed limitation.

Still furthermore, if the vehicle recognizes that it has entered a specific area and forcibly restricts the vehicle speed, the driver may feel reluctance, and a more dangerous situation may arise due to the inability to maneuver through emergency evasion. Furthermore, there is a problem that adverse effects may occur when misrecognizing whether to enter the specific area.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle provided with an electric motor configured for more effective warning output and a method of outputting warning for the same.

Various aspects of the present invention are directed to providing a vehicle provided with an electric motor configured for outputting a deceleration warning so that a driver can intuitively recognize it, and a method of outputting warning for the same.

The technical problems to be achieved in various exemplary embodiments of the present invention are not limited to the technical problems mentioned above, and other technical problems that are not mentioned will be clearly understood by those of ordinary skill in the field of the invention to which various exemplary embodiments of the present invention belongs from the following description.

To solve the technical purposes above, the method of outputting warning for an electric vehicle including an electric motor as a driving source according to various exemplary embodiments of the present invention may include the steps of: recognizing, by a controller, a stop point or a deceleration section where a pause or deceleration of the vehicle is required or recommended; setting, by the controller, a virtual road surface facility based on the stop point or a start point of the deceleration section; outputting, by the controller, information on a set position of the set virtual facility or a distance remaining from the vehicle to the set position; and implementing, by the controller, driving feeling passing through the set virtual road surface facility as a pitching motion of the vehicle using a torque control of the electric motor according to a vehicle speed when the electric vehicle passes the set position.

Furthermore, the electric vehicle including an electric motor as a driving source according to various exemplary embodiments of the present invention may include: an information output device; a first controller that sets a virtual road surface facility based on a stop point or a start point of a deceleration section when recognizing the stop point or the deceleration section which is required or recommended for pause or deceleration, allows information on a set position of the set virtual facility or a distance remaining from the vehicle to the set position to be output through the information output device, and outputs a toque command so that driving feeling passing through the set virtual road surface facility is implemented as a pitching motion of the vehicle using torque control of the electric motor according to a vehicle speed when the electric vehicle passes the set position; and a second controller which is configured to control the electric motor according to the torque command received from the first controller.

The vehicle provided with an electric motor configured as described according to at least various exemplary embodiments of the present invention can more effectively output a warning.

It is possible to transmit an intuitive and effective warning to a driver by determining whether or not to output a warning for deceleration or the like according to a situation and simulating the behavior which is occurred when passing through the facilities provided on a road surface through torque control of the motor.

The effects obtainable as various exemplary embodiments of the present invention are not limited to the above-mentioned effects, and other effects not mentioned may be clearly understood by those of ordinary skill in the art from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a flowchart illustrating an example of a method of controlling warning output according to various exemplary embodiments of the present invention.

Figure 1:
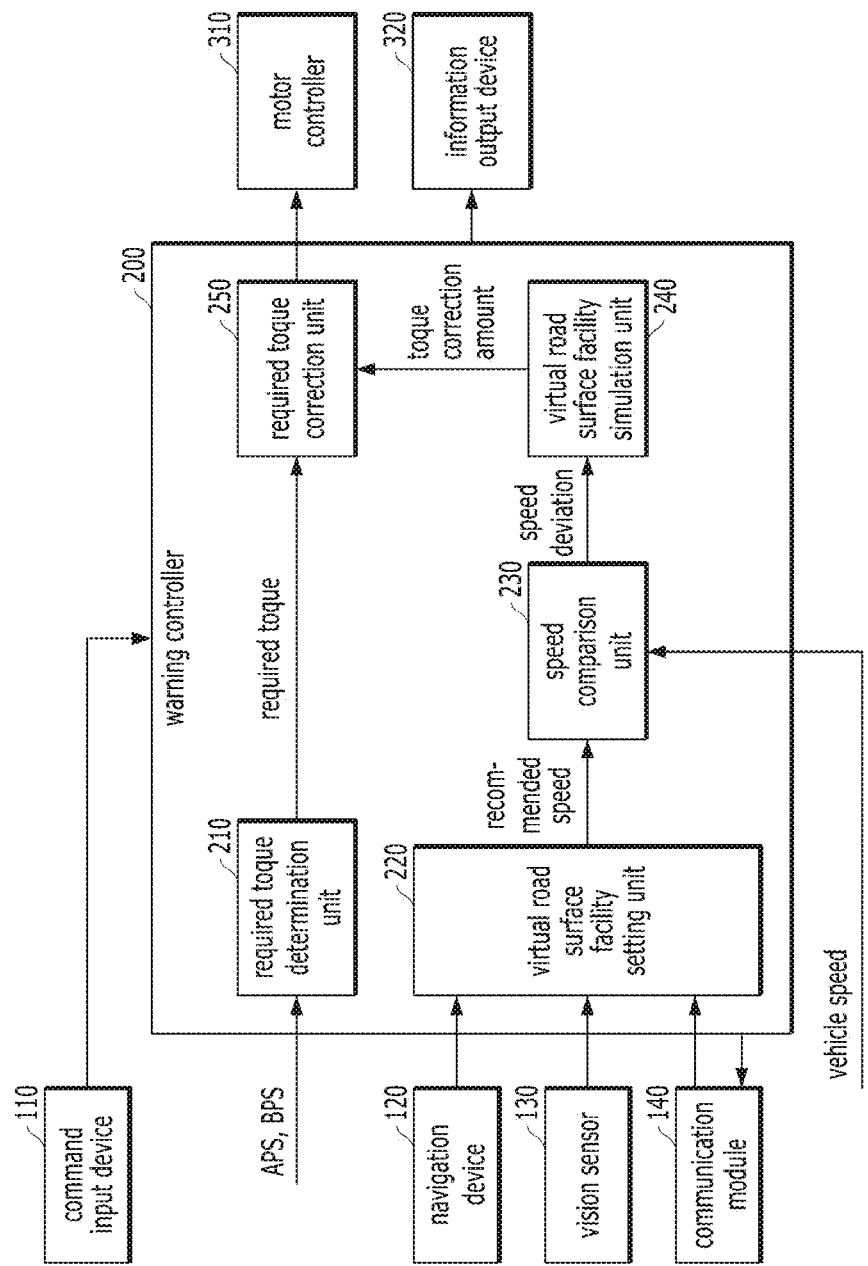
FIG. 1 shows an example of a configuration of an electric vehicle which may be applied to exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings so that those of ordinary skill in the art may easily implement the present invention. However, the present invention may be implemented in various different forms and is not limited to the exemplary embodiments described herein. In the drawings, the parts irrelevant to the description are omitted to clearly describe the present invention, and similar reference numerals are attached to similar parts throughout the specification.

Throughout the specification, when a part "includes" a certain component, it means that other components may be further included rather than excluding other components unless specifically stated to the contrary. In addition, the parts denoted by the same reference numbers throughout the specification mean the same components.

Various exemplary embodiments of the present invention suggests, in outputting a warning for inducing a driver to decelerate the vehicle provided with a motor (hereinafter, referred to as an "electric vehicle" for convenience), implementing the feeling of passing through a virtual road surface facility as a vehicle body behavior by use of the pitching motion of the vehicle body according to the torque change of the motor, and outputting a warning.

FIG. 1 shows an example of a configuration of an electric vehicle which may be applied to exemplary embodiments of the present invention.

Referring to FIG. 1, the electric vehicle according to the exemplary embodiment includes a command input device 110, a navigation device 120, a vision sensor 130, a communication module 140, a warning controller 200, a motor controller 310 and an information output device 320. The components shown in FIG. 1 show only components related to the implementation of the exemplary embodiment of the present invention, and an actual electric vehicle may include more components than this, or some components may be omitted. Hereinafter, each component will be described in more detail.

The command input device 110 is a device that receives a user's command for setting whether to activate warning output function, or setting a warning output condition or target through a user setting menu (USM) and the lime, and includes a key button, a dial, a touch screen and the like, but are not limited thereto.

The navigation device 120 may determine a preset section for requiring deceleration on a map, such as a child protection zone, an elderly protection zone, etc., based on a current location, a moving direction, a set route, etc., and also retain information on local regulations/recommended speeds. Furthermore, when a section required or recommended for pause or deceleration is determined, the navigation device 120 may determine a distance between the corresponding location and the current location and whether or not to enter.

The vision sensor 130 may determine the situations required or recommended for deceleration, pause or slow speed through the detection of a crosswalk without a traffic light, the recognition of the status of the traffic light (red-light flashing, yellow-light flashing, etc.), the detection of a commuting vehicle at a stop, the recognition of signs, etc., based on the image captured through an optical device such as a camera.

The method of determining a stop point or a deceleration section using the navigation device 120 and the vision sensor 130 will be described with reference to FIG. 2.

FIG. 2A, FIG. 2B, FIG. 2C, and FIG. 2D are views for explaining a method of determining a deceleration section or a stop point according to various exemplary embodiments of the present invention.

Figure 2A:
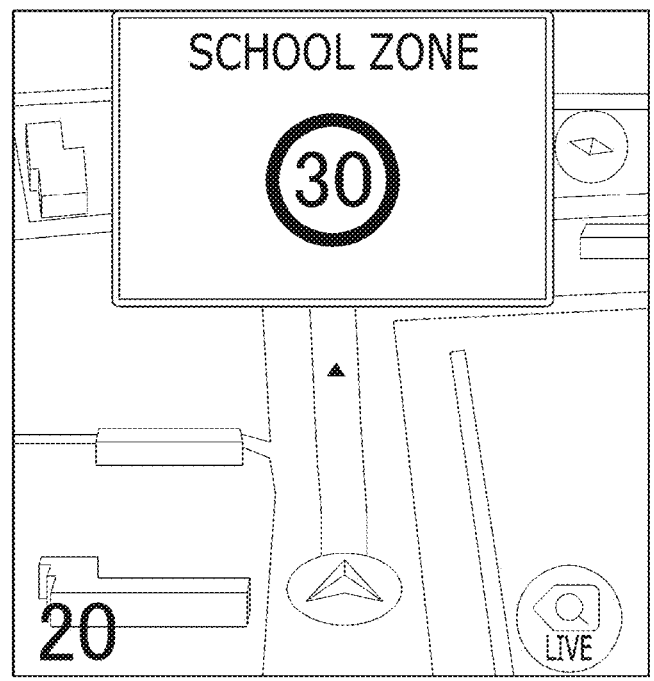
FIG. 2A, FIG. 2B, FIG. 2C, and FIG. 2D are views for explaining a method of determining a deceleration section or a stop point according to various exemplary embodiments of the present invention.

Referring to FIG. 2A, the navigation device 120 may determine whether or not for the vehicle to enter a preset deceleration section on a map, such as a child protection zone, and also determine the recommended/restricted speed of the corresponding deceleration section.

Figure 2B:
Figure 2C:
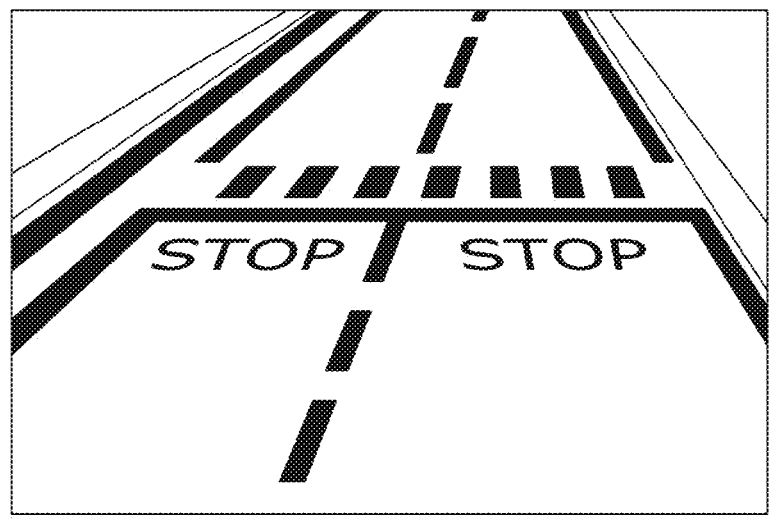
Figure 2D:
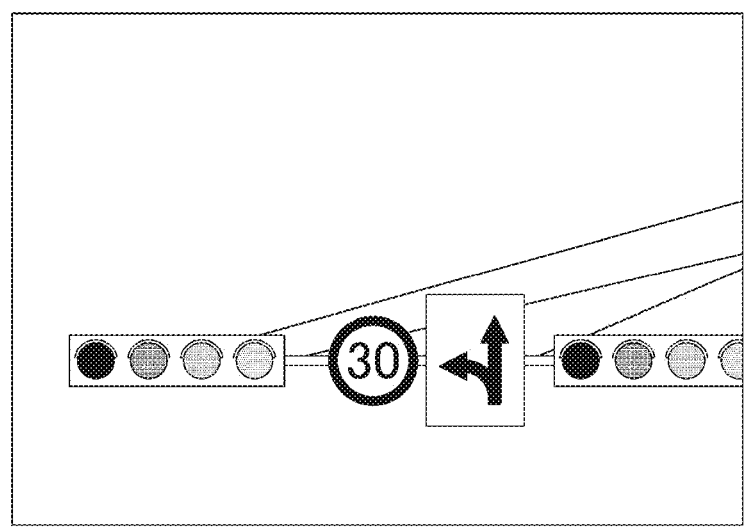

The vision sensor 130 may recognizes a pause sign as shown in FIG. 2B, a crosswalk without a traffic light as shown in FIG. 2C, a flashing signal or speed limit sign as shown in FIG. 2D, etc.

Returning to FIG. 1 again, the communication module 140 may acquire, based on the V2X communication, event information such as information on whether an accident in the vicinity has occurred, information on the remaining time until a signal change of a front traffic light, which is impossible to check with a naked eye or whether a deceleration is required or not depending on the lapse of time, information on the construction section in front, information on the detection of pedestrians detected by vehicles in front, etc.

When a warning providing function is activated according to a command input by the command input device 110 or a default setting, the warning controller 200 may determine a motor torque for simulating a driving feeling passing through a virtual road surface facility through a vehicle body behavior control. To the present end, the warning controller 200 may include a required torque determination unit 210, a virtual road surface facility setting unit 220, a speed comparison unit 230, a virtual road surface facility simulation unit 240, and a required torque correction unit 250.

The required torque determination unit 210 may determine the required torque of the driver based on an accelerator pedal position sensor (APS) value and a brake pedal position sensor (BPS) value.

The virtual road surface facility setting unit 220 may determine a stop point or a deceleration section that requires a temporary stop in the front based on the information obtained from at least one of the navigation device 120, the vision sensor 130, and the communication module 140, and determine a recommended speed which is a speed recommended when passing through the corresponding point. For example, the stop point may be a stop point for a commuting vehicle, a crosswalk without a traffic light, an intersection with a flashing red traffic light on, etc., but is not limited thereto. Furthermore, the deceleration section may be a speed limit change section, a sharp curve section, a child protection section, a ramp section, etc., but is not limited thereto. Still furthermore, the recommended speed may be a preset vehicle speed (e.g., 20 kph) for the stop point, and may be a preset recommended speed or speed limit for a corresponding section in the deceleration section. Furthermore, it is obvious that the stop point or the deceleration section may be set based on a specific time zone, such as an attendance/dismissal time zone.

When a stop point or a deceleration section and a recommended speed corresponding thereto is determined, the virtual road surface facility setting unit 220 may set up a virtual road surface facility at a predetermined distance ahead from the corresponding stop point or start point of the deceleration section. Here, the predetermined distance may be a preset distance (e.g., 20 m), or may be set differently according to the cause or type of the current vehicle speed, the stop point, and the deceleration section. For example, as the difference between the current vehicle speed and the recommended speed increases, the distance from the stop point or the start point of the deceleration section to the set point may increase, but is not limited thereto.

Furthermore, the virtual road surface facility setting unit 220 may also determine the shape of the virtual road surface facility to be set at the set point. For example, the virtual road surface facility may include speed bumps, road surface irregularity, and the like. In the case of speed bumps, the maximum height and length may be variably determined, and in the case of the road surface irregularity, the depth of a groove, the length of the groove, the interval between the grooves, etc. may be variably determined. It is obvious that the shape of the virtual road facility may be set differently depending on the cause or type of the stop point and the deceleration section, or may be set to a preset default type.

The speed comparison unit 230 may determine a difference between the current vehicle speed and the recommended speed.

When the vehicle passes through the set position of the virtual road surface facility set by the virtual road surface facility setting unit 220 based on the vehicle speed, the recommended speed, and the difference between the two speeds, the virtual road surface facility simulation unit 240 may determine the motor torque which is required to implement a driving feeling passing through the set virtual road surface facility by generating a pitching motion.

A pitching motion is generated so that the front of the vehicle is in nose-up compared to the center of gravity when accelerating, and the front is in nose-down compared to the center of gravity when decelerating. Accordingly, a pitching motion similar to that when passing through the road surface facility may be implemented through control of adding intermittent acceleration/deceleration torque to the driver's required torque. This will be described with reference to FIG. 3 and FIG. 4.

Figure 3:
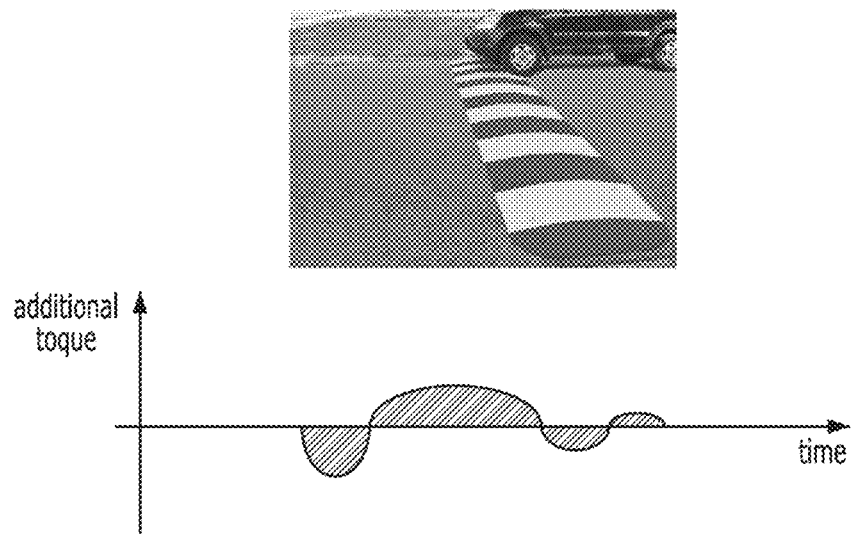
FIG. 3 shows an example of a simulated torque form for simulating a speed bump according to various exemplary embodiments of the present invention.
Figure 4:
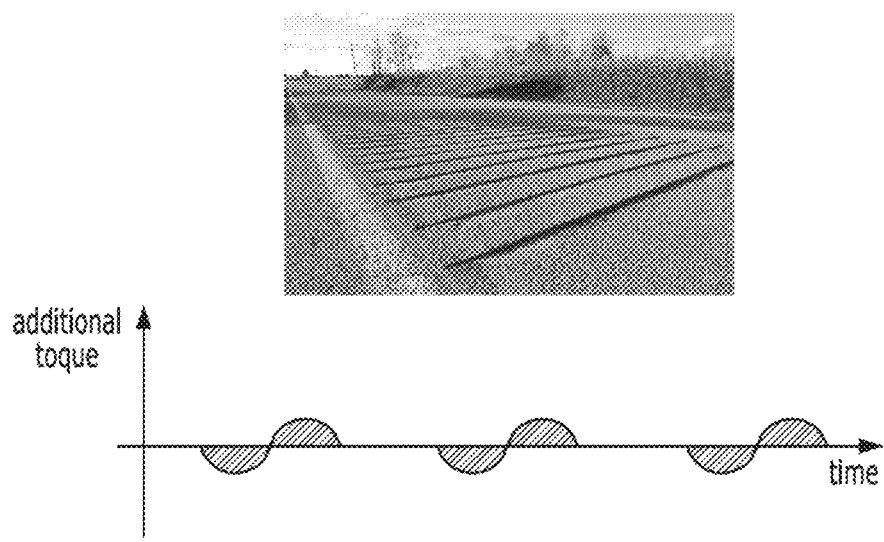
FIG. 4 shows an example of a simulated torque form for simulating a road surface irregularity according to various exemplary embodiments of the present invention.

FIG. 3 shows an example of a simulated torque form for simulating a speed bump according to various exemplary embodiments of the present invention, and FIG. 4 shows an example of a simulated torque form for simulating a road surface irregularity according to various exemplary embodiments of the present invention.

First, referring to FIG. 3, when the wheel of the vehicle actually exceeds a speed bump, a nose-up occurs first and leads to nose down while passing through the peak of the speed bump. After that, residual vibration occurs in a form of a sinusoidal wave that attenuates nose up/down by the vehicle's suspension. To simulate such vehicle behavior, in addition to the motor torque according to the driver's required torque, an additional torque in a form of alternatively applying a reverse torque and a forward torque for simulating the speed bump may be output from the motor. For example, as shown in the graph, the additional torque first generates a nose down with a short deceleration by applying the reverse torque, and implements the nose up behavior by immediately applying the large forward torque. The reason why the nose down occurs first is to increase the pitching size. Thereafter, when the forward torque is attenuated and then converted to the reverse torque, the vehicle generates the nose down as if passing through the peak of the speed bump, and even residual vibration may be implemented by controlling the additional torque in a form of a sinusoidal wave while reducing the size of the additional torque. Through the present additional torque control, even if there is no speed bump on the actual road surface, the driver can feel the feeling of passing through the speed bump.

Next, referring to FIG. 4, when passing through the actual road surface irregularity having a certain pattern, the behavior in which the nose down occurs when a wheel of the vehicle falls into the groove, and the nose up occurs when the wheel leaves the groove is repeated. To simulate such vehicle behavior, an additional torque may be determined so that a torque pattern intersecting the reverse torque and the forward torque in a form of a sinusoidal wave is periodically generated. In the instant case, the period of the torque pattern may be set in consideration of the vehicle speed and the distance between the grooves of the set virtual road surface irregularity.

The more detailed determination of the additional torque will be described with reference to FIG. 5 and FIG. 6.

Figure 5A:
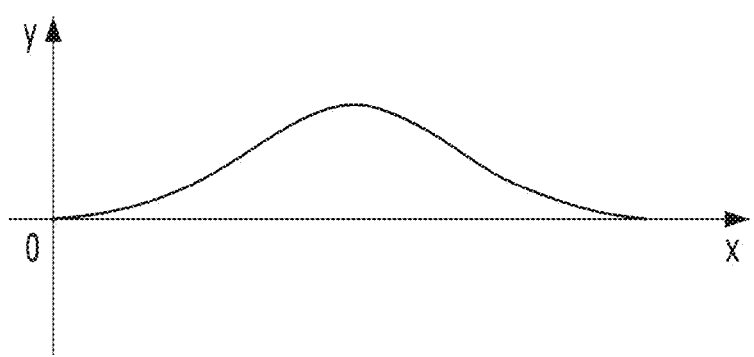
FIG. 5A and FIG. 5B show examples of a virtual setting form for each road surface facility according to various exemplary embodiments of the present invention.
Figure 5B:
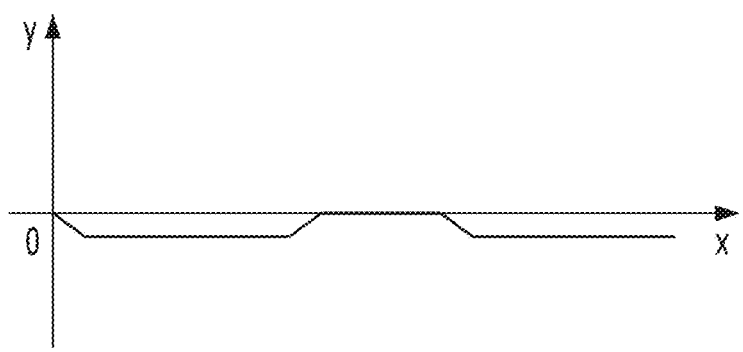
Figure 6A:
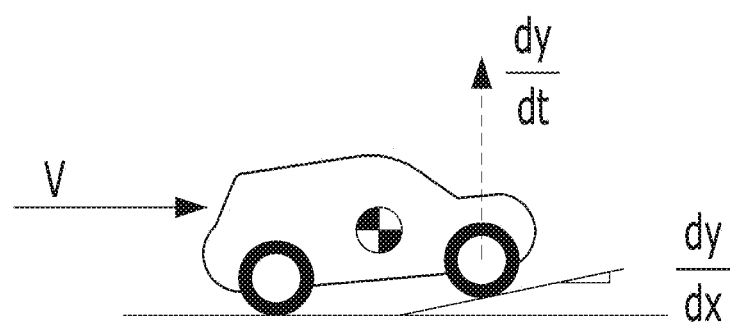
FIG. 6A, FIG. 6B, and FIG. 6C are views for explaining a process of obtaining a simulated torque for implementing a driving feeling according to the setting form shown in FIG. 5.
Figure 6B:
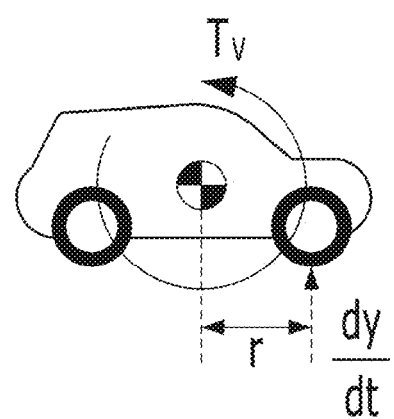
Figure 6C:
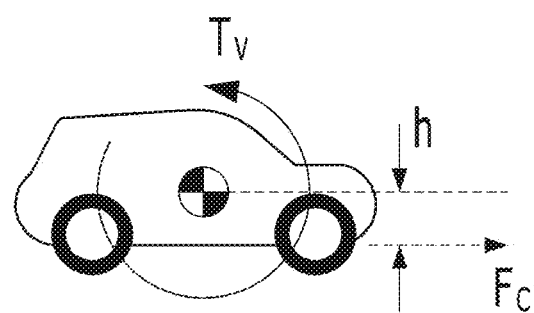

FIG. 5A and FIG. 5B show examples of a virtual setting form for each road surface facility according to various exemplary embodiments of the present invention, and FIG. 6A, FIG. 6B, and FIG. 6C are views for explaining a process of obtaining a simulated torque for implementing a driving feeling according to the setting form shown in FIG. 5A and FIG. 5B.

First, referring to FIG. 5A and FIG. 5B, a virtual ground height (y) for a driving distance (x) may be defined for each virtual road surface facility. For example, the virtual speed bump may be defined as shown in FIG. 5A, and the virtual road surface irregularity may be defined in the form as shown in FIG. 5B.

If the virtual road surface facility is defined in the form as shown in FIG. 5A and FIG. 5B, as shown in FIG. 6A, the vehicle's passing speed, that is, the virtual acceleration in the height direction (dy/dt) which may be generated in the wheel with respect to the vehicle speed (v), may be determined.

For example, the virtual acceleration in the height direction (dy/dt) may be determined as in Equation 1 below.

$$\frac{dy}{dt} = \frac{dy}{dx} \cdot \frac{dx}{dt} = \frac{dy}{dx} \cdot v \qquad \text{[Equation 1]}$$

Next, referring to FIG. 6B, a moment (Tv) to be generated in the vehicle may be determined based on the acceleration in the height direction. In FIG. 6B, r denotes the horizontal distance between the center of gravity and the front axle, that is, the companion mirror with respect to the center of gravity of the pitching motion.

For example, the moment (Tv) may be determined as in Equation 2 below.

$$T_v = J \cdot \omega = J \cdot \left(\frac{1}{r} \cdot \frac{dy}{dt}\right) \qquad \text{[Equation 2]}$$

In Equation 2, J denotes the moment of inertia of the vehicle.

Next, referring to FIG. 6C, an additional torque, that is, an equivalent driving force increase/decrease (Fc) may be determined using the vertical distance (h) between the center of gravity and the front axle and the moment (Tv).

The equivalent driving force increase/decrease (Fc) may be determined as in Equations 3 and 4 below.

$$T_v = J \cdot \left(\frac{1}{r} \cdot \frac{dy}{dt}\right) = h \cdot F_c \qquad \text{[Equation 3]}$$

As shown in Equation 3, the moment (Tv) is equal to the product of the equivalent driving force increase/decrease (Fc) and the vertical distance (h) between the center of gravity and the front axle. If this is summarized for the equivalent driving force increase/decrease (Fc), it is shown in Equation 4 below.

$$\therefore F_c = J \cdot \left(\frac{1}{r \cdot h} \cdot \frac{dy}{dx}\right) \cdot v \qquad \text{[Equation 4]}$$

Returning to FIG. 1 again, the required torque correction unit 250 may add the additional torque (that is, the torque correction amount) determined as described above to the required torque to output the final toque command to be output by the motor to the motor controller 310.

The motor controller 310 may control the motor so that the torque corresponding to the final torque command transmitted from the requested torque correction unit 250 is output from the motor.

Furthermore, the information output device 320 may include a display for outputting visual information, a speaker for outputting sound information, etc. Accordingly, when the warning controller 200 sets the virtual road surface facility, the information output device 320 may output the information in a predetermined form indicating that the virtual road surface facility is set and the information on the remaining distance to the set location.

Furthermore, the warning controller 200 may store whether or not the warning function is used through the above-described virtual road surface facility, whether or not the recommended speed is observed when passing through the set virtual road surface facility, and the like, and transmit it to an external object (e.g., a telematics center, a service server, etc.) through the communication module 140. The information transmitted to the outside as described above may be used as basis information for providing insurance premium discounts, driving habit improvement guides and the like.

The method of providing warnings through the setting of the virtual road surface facility described so far may be summarized in a flow chart as shown in FIG. 7.

FIG. 7 is a flow chart showing an example of a warning output control method according to various exemplary embodiments of the present invention.

Referring to FIG. 7, the warning controller 200 may recognize a stop point or a deceleration section in front based on the information obtained from at least one of the navigation device 120, the vision sensor 130, and the communication module 140 (S710). At the instant time, the warning controller 200 may also determine a recommended speed of the vehicle corresponding to the stop point or the deceleration section.

When the stop point or the deceleration section in front is recognized, the warning controller 200 may set a virtual road surface facility at or in front of the stop point or the start point of the deceleration section (S720).

Furthermore, the warning controller 200 may cause the information on the virtual road surface facility (e.g., the distance to the set point, the reason for setting the virtual road surface facility, etc.) to be output through the information output device 320 (S730).

Thereafter, the warning controller 200 determines whether or not the vehicle speed satisfies the recommended speed or less until reaching the set point (S740) (S750).

If the vehicle speed reaches the set point and exceeds the recommended speed (No in S750), the warning controller 200 may determine additional toque for simulating the driving feeling passing through the virtual road surface facility set by the method described above with reference to FIG. 4, FIG. 5 and FIG. 6, and by adding this to the required toque, control the motor to output this (S760A).

If the speed is less than the recommended speed (Yes in S750), the warning controller 200 may control so that the additional torque for simulating the driving feeling passing through the set virtual road surface facility is not output through the motor (S760B).

Thereafter, the warning controller 200 may store whether or not the warning function is used through the virtual road surface facility, whether or not the recommended speed is observed when passing through the set virtual road surface facility, and the like, and perform a following process such as transmitting to an external object (e.g., a telematics center, a service server, etc.) through the communication module 140. (S770).

According to the exemplary embodiments of the present invention described so far, it is possible to effectively output a warning while securing the driver's convenience. For example, when driving below the recommended speed, there is no warning output that causes a change in the vehicle behavior, so comfort is ensured, and when driving exceeding the recommended speed, a pitching motion occurs in the vehicle, so that the speeding condition may be effectively informed to the driver. Accordingly, a higher rate of compliance with deceleration may be expected due to the driver's concern about drivability or vehicle durability, rather than simple auditory/visual guidance.

Furthermore, whether or not the warning output function is used and whether or not the recommended speed is observed may be used as a criterion for granting benefits such as a reduction in insurance premiums, etc., and if it is widely distributed, the need to install an actual road surface facility decreases, so social cost reduction can also be expected.

The present invention described above may be implemented as a computer-readable code on a medium on which a program is recorded. The computer-readable medium includes all types of recording devices that store computer system-readable data. As examples of computer-readable media, there are a hard disk drive (HDD), a solid state disk (SSD), a silicon disk drive (SDD), ROM, RAM, CD-ROM, a magnetic tape, a floppy disk, an optical data storage device, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of outputting warning for a vehicle having an electric motor as a driving source, the method comprising:
   recognizing, by a controller, a stop point or a deceleration section where a pause or deceleration of the vehicle is required or recommended;
   setting, by the controller, a virtual road surface facility based on the stop point or a start point of the deceleration section;
   outputting, by the controller, information on a set position of the set virtual facility or a distance remaining from the vehicle to the set position; and
   implementing, by the controller, driving feeling passing through the set virtual road surface facility as a pitching motion of the vehicle using a torque control of the electric motor according to a vehicle speed when the vehicle passes the set position.

2. The method of claim 1, further including:
   determining a recommended speed of the vehicle corresponding to the stop point or the deceleration section, wherein the implementing driving feeling is performed when the vehicle speed is greater than the recommended speed at the set position.

3. The method of claim 2, further including:
   omitting the implementing driving feeling when the vehicle speed at the set position is less than the recommended speed.

4. The method of claim 1, wherein the virtual road surface facility includes a speed bump or a road surface irregularity of a predetermined pattern.

5. The method of claim 1, wherein the recognizing a stop point or a deceleration section is performed according to information acquired through at least one of a navigation device, a vision sensor, and a communication module electrically connected to the controller.

6. The method of claim 1, wherein the set position is determined as the stop point, the start point of the deceleration section, or a predetermined distance from the vehicle to the stop point or the start point.

7. The method of claim 2, wherein the implementing driving feeling is performed according to a setting of a user.

8. The method of claim 7, further including:
   transmitting information externally on whether the setting is activated and whether the recommended speed is observed by the vehicle.

9. The method of claim 8,
   wherein the setting a virtual road surface facility includes setting a shape of the virtual road surface facility, and
   wherein the implementing driving feeling includes:
      determining an acceleration in a height direction of the vehicle to be generated in a wheel of the vehicle with respect to the vehicle speed according to the set shape;
      determining a moment to be generated in the vehicle according to the determined acceleration in the height direction;
      determining an increase or decrease in an equivalent driving force according to the determined moment; and
      adding an additional torque corresponding to the increase or decrease amount in the equivalent driving force, to a driver's required torque.

10. A non-transitory computer-readable recording medium in which a program for executing the method of claim 1 is recorded.

11. A vehicle including an electric motor as a driving source, the vehicle comprising:
   an information output device;
   a first controller electrically connected to the information output device and configured to set a virtual road surface facility based on a stop point or a start point of a deceleration section when recognizing the stop point or the deceleration section which is required or recommended for pause or deceleration of the vehicle, to allow information on a set position of the set virtual facility or a distance remaining from the vehicle to the set position to be output through the information output device, and to output a toque command so that driving feeling passing through the set virtual road surface facility is implemented as a pitching motion of the vehicle using torque control of the electric motor according to a vehicle speed when the vehicle passes the set position; and
   a second controller electrically connected to the first controller and the electric motor and configured to control the electric motor according to the torque command received from the first controller.

12. The vehicle according to claim 11, wherein the first controller is configured to determine a recommended speed of the vehicle corresponding to the stop point or the deceleration section, and to control the second controller so that the driving feeling is implemented when the vehicle speed is greater than the recommended speed at the set position.

13. The vehicle according to claim 12, wherein the first controller is configured to control the second controller so that the implementing driving feeling is omitted when the vehicle speed at the set position is less than the recommended speed.

14. The vehicle according to claim 11, wherein the virtual road surface facility includes a speed bump or a road surface irregularity of a predetermined pattern.

15. The vehicle according to claim 11, wherein the first controller is configured to perform the recognizing of the stop point or the deceleration section according to information acquired through at least one of a navigation device, a vision sensor, and a communication module electrically connected to the first controller.

16. The vehicle according to claim 11, wherein the set position is determined as the stop point, the start point of the deceleration section, or a predetermined distance from the vehicle to the stop point or the start point.

17. The vehicle according to claim 12, wherein the first controller is configured to differentiate whether or not to implement the driving feeling, depending on a setting of a user.

18. The vehicle according to claim 17, further including a communication module electrically connected to the first controller,
   wherein the first controller is configured to control information on whether or not the setting is activated and whether or not the recommended speed is observed by the vehicle to be transmitted externally through the communication module.

19. The vehicle according to claim 18, wherein the first controller is configured to determine a shape of the virtual road surface facility, to determine an acceleration in a height direction of the vehicle to be generated in a wheel of the vehicle with respect to the vehicle speed according to the determined shape, to determine a moment to be generated in the vehicle according to the determined acceleration in the height direction and an increase or decrease in an equivalent driving force based on the determined moment, and to add an additional torque corresponding to the increase or decrease amount in the equivalent driving force, to a driver's required torque to output the toque command.

* * * * *